United States Patent
Nakano et al.

(10) Patent No.: US 7,622,055 B2
(45) Date of Patent: Nov. 24, 2009

(54) POLARIZING PLATE AND IMAGE DISPLAY INCLUDING THE SAME

(75) Inventors: Shinya Nakano, Ibaraki (JP); Kazutaka Hara, Ibaraki (JP); Takehito Fuchida, Ibaraki (JP); Naoto Ooe, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 262 days.

(21) Appl. No.: 11/748,212

(22) Filed: May 14, 2007

(65) Prior Publication Data

US 2007/0269616 A1 Nov. 22, 2007

(51) Int. Cl.
*C09K 19/00* (2006.01)
*C09K 19/06* (2006.01)
*C09K 19/52* (2006.01)

(52) U.S. Cl. .................. 252/299.01; 428/1.1; 428/1.3; 428/1.31; 430/20

(58) Field of Classification Search .................. 428/1.1, 428/1.3, 1.31; 430/20; 252/299.01
See application file for complete search history.

(56) References Cited

U.S. PATENT DOCUMENTS

2007/0254087 A1* 11/2007 Suzuki et al. ............... 426/602

FOREIGN PATENT DOCUMENTS

| JP | 2005-010329 A | 1/2005 |
| JP | 2005-338550 A | 12/2005 |

* cited by examiner

*Primary Examiner*—Geraldina Visconti
(74) *Attorney, Agent, or Firm*—Westerman, Hattori, Daniels & Adrian, LLP

(57) ABSTRACT

A polarizing plate is provided that has excellent polarization properties and high surface hardness and can have a reduced thickness. The polarizing plate includes a polarizer and a cured resin layer. The cured resin layer is formed directly on at least one surface of the polarizer. The cured resin layer is formed of a solventless photocurable composition containing the following components (A), (B), and (C):
(A) at least one of a polyfunctional acrylic monomer and a polyfunctional methacrylic monomer;
(B) a photocurable prepolymer; and
(C) a photopolymerization initiator.

13 Claims, 2 Drawing Sheets

POLARIZING PLATE AND IMAGE DISPLAY INCLUDING THE SAME

CROSS-REFERENCE TO RELATED APPLICATIONS

This application claims priority from Japanese Patent Application Nos. 2006-136943 filed on May 16, 2006 and 2007-102200 filed on Apr. 9, 2007 the entire contents of which are hereby incorporated by reference.

BACKGROUND OF THE INVENTION

1. Field of the Invention

The present invention relates generally to polarizing plates and image displays including the same.

2. Description of the Related Art

A liquid crystal display (LCD) is one of the various image displays available. An LCD is a device that displays, for example, letters and images using electrooptic properties of liquid crystal molecules. Generally, an LCD is provided with a liquid crystal cell and two polarizing plates disposed on both sides of the liquid crystal cell. Generally, the polarizing plates each have a structure in which a protective film is attached to both sides of a polarizer with an adhesive. Conventionally, a triacetyl cellulose (TAC) film is widely used as the protective film. Furthermore, the polarizing plates may be subjected to a hard-coating (hardening) treatment. The hard-coating treatment is carried out by forming a hard-coating layer on the TAC film using a photocurable resin. Commonly, one of the TAC films provided on both sides of the polarizer is subjected to the hard-coating treatment (for instance, see Japanese Patent Application Laid-Open (JP-A) No. 2005-338550).

On the other hand, with increased applications of LCDs, for example, mobile devices such as cellular phones and car navigation units, there are demands for the polarizing plates to have an improved hardness. Furthermore, there also are demands for the polarizing plates to have a reduced thickness. In order to meet these demands, a polarizing plate has been proposed in which the TAC film is omitted and a protective layer is formed on the surface of a polarizer using a photopolymerizable compound (Japanese Patent Application Laid-Open (JP-A) No. 2005-10329).

With respect to the improvement in hardness, conventionally there has been no polarizing plate exhibiting a hardness of at least 6H in the pencil hardness test method described in JIS K 5400 (1990 version). Moreover, the polarizing plate wherein the TAC film is omitted and a protective film is formed on the surface of a polarizer using a photopolymerizable compound to reduce the thickness, has a problem with polarization properties.

SUMMARY OF THE INVENTION

The present invention is intended to provide a polarizing plate that has a high hardness, can have a reduced thickness, and has excellent polarization properties, and an image display including the same.

In order to achieve the above-mentioned object, a polarizing plate of the present invention includes a polarizer and a cured resin layer. The cured resin layer is formed directly on at least one surface of the polarizer. The cured resin layer is formed of a solventless photocurable composition containing the following components (A), (B), and (C):

(A) at least one of a polyfunctional acrylic monomer and a polyfunctional methacrylic monomer;

(B) a photocurable prepolymer; and (C) a photopolymerization initiator.

An image display of the present invention includes a polarizing plate mounted thereon and is characterized in that the polarizing plate is a polarizing plate of the present invention.

The present inventors made a series of studies with respect to the deterioration in properties of conventional polarizing plates in which a protective film was formed directly on a polarizer using a photocurable compound. As a result, it was found that the deterioration in properties resulted from erosion of a polarizer caused by a solvent used for forming the protective layer in the conventional polarizing plates. Based on this finding, it was further found that when a cured resin layer was formed directly on at least one surface of a polarizer using the solventless photocurable composition having the aforementioned composition, the properties of the polarizer were not deteriorated and a cured resin layer with a higher hardness than that of conventional hard-coating layers was formed. Thus the present invention was completed. The polarizing plate of the present invention has excellent optical properties, a higher hardness than that of conventional one, and can have a reduced thickness since the protective layer can be omitted.

DETAILED DESCRIPTION OF THE INVENTION

Figure 1:
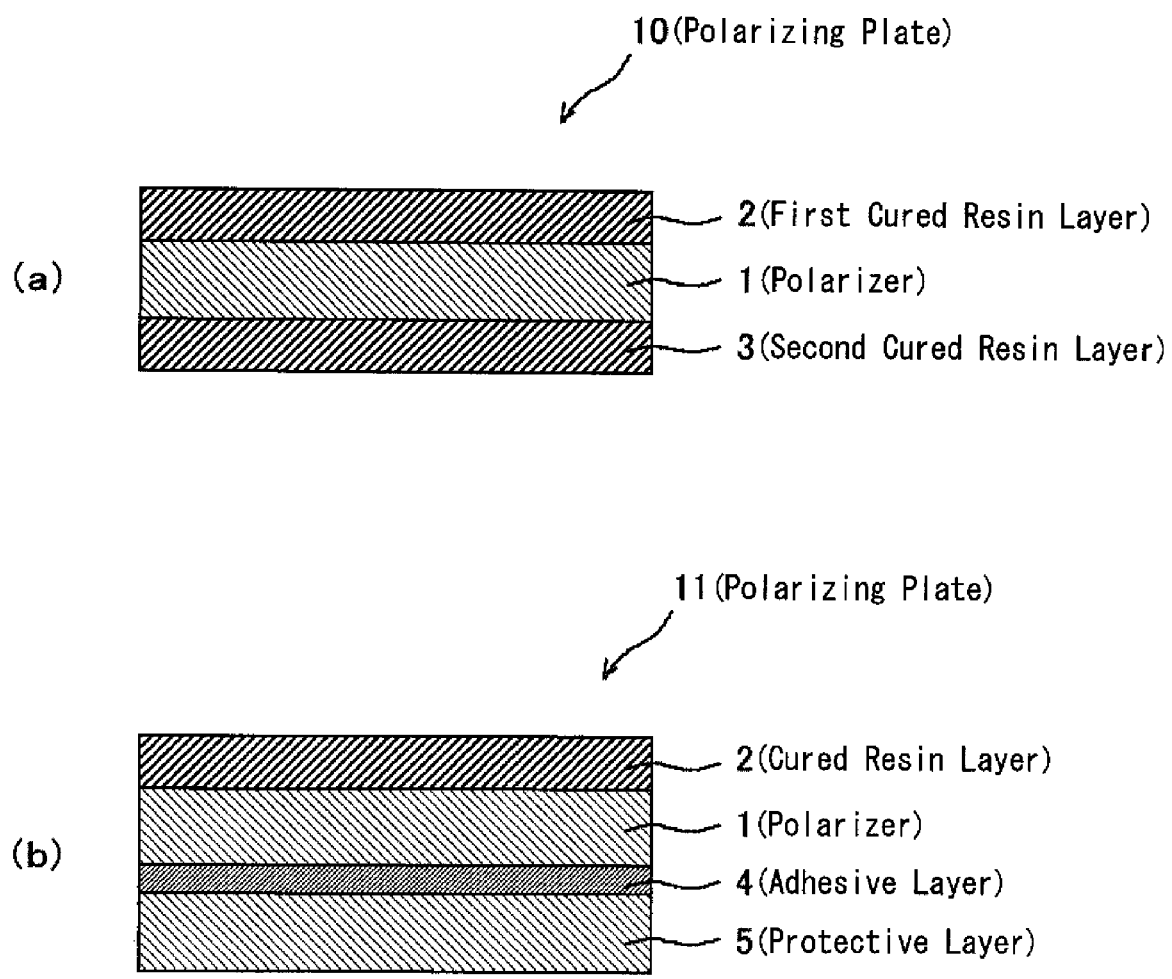
FIGS. 1(a) and (b) are sectional views showing examples of the structure of a polarizing plate according to the present invention.

In the polarizing plate of the present invention, the ratio ($d_1/d_2$) between the thickness ($d_1$) of the cured resin layer and the thickness ($d_2$) of the polarizer is preferably in the range of 0.3 to 1.2.

In the polarizing plate of the present invention, the difference ($d_1-d_2$) between the thickness ($d_1$) of the cured resin layer and the thickness ($d_2$) of the polarizer is preferably in the range of $-20$ μm to $+5$ μm.

In the polarizing plate of the present invention, it is preferable that the polarizer have a composite elastic modulus of at least 6 GPa.

In the polarizing plate of the present invention, it is preferable that the cured resin layer have a thickness in the range of 10 μm to 30 μm.

In the polarizing plate of the present invention, it is preferable that the polyfunctional acrylic monomer or the polyfunctional methacrylic monomer, component (A), includes in its molecular structure at least four groups selected from an acryloyl group or methacryloyl group. In this case, the polyfunctional acrylic monomer and the polyfunctional methacrylic monomer, component (A), are preferably monomers represented by the following general formula (I):

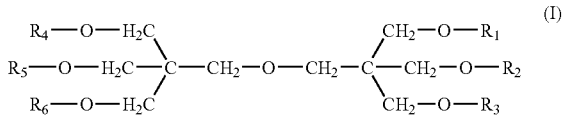

In the above-mentioned general formula (I), $R_1$, $R_2$, $R_3$, $R_4$, $R_5$, and $R_6$ each are selected from a hydrogen atom, an acryloyl group, and a methacryloyl group, and at least four of $R_1$, $R_2$, $R_3$, $R_4$, $R_5$, and $R_6$ are selected from an acryloyl group and a methacryloyl group.

In the polarizing plate of the present invention, it is preferable that the photocurable prepolymer, component (B), be at least one of polyurethane acrylate and polyurethane methacrylate.

In the polarizing plate of the present invention, it is preferable that the solventless photocurable composition include the following component (D):

(D) a reactive diluent.

In the polarizing plate of the present invention, the photopolymerization initiator, component (C), is preferably an acetophenone initiator.

In the polarizing plate of the present invention, it is preferable that the polarizer contain iodine and polyvinyl alcohol resin.

In the polarizing plate of the present invention, it is preferable that the cured resin layer serves as both a hard-coating layer and a protective layer.

A method of producing a polarizing plate of the present invention is a production method that includes the following steps (A) and (B) and further may include step (C):

(A) forming a coating film by applying the photocurable composition onto at least one surface of a polarizer;

(B) forming a cured resin layer by curing the coating film through a light irradiation treatment; and (C) stacking a protective layer on the surface of the polarizing plate on which the cured resin layer has not been formed, with an adhesive layer or a pressure-sensitive adhesive layer being interposed therebetween. Preferable embodiments and conditions for the production method of the present invention are the same as those for the polarizing plate of the present invention. However, the polarizing plate of the present invention can be produced by a method other than the above-mentioned production method.

Next, the present invention is described in detail using examples.

[A. Polarizing Plate of the Present Invention]

As described above, the polarizing plate of the present invention has a structure in which the cured resin layer is formed directly on at least one surface of the polarizer using a photocurable composition. In the present invention, the cured resin layer can be formed on one surface of the polarizer or on both surfaces of the polarizer. In the present invention, the aforementioned phrase "formed directly" denotes that the polarizer and the cured resin layer are stacked together in the state of being in direct contact with each other, with no other layer, such as an adhesive layer or a pressure-sensitive adhesive layer, or other member being interposed therebetween. In the present invention, the planar shape of the polarizing plate is, for instance, a rectangle. It can be a square or an oblong, but is preferably an oblong. Accordingly, in the present invention, the shapes of the respective components such as the polarizer and cured resin layer are preferably rectangles. They can be squares or oblongs, but are preferably oblongs to match with the planar shape of the polarizing plate. As described above, it is preferable that the cured resin layer serve as both a protective layer and a hard-coating layer. In this embodiment, the polarizing plate can have a reduced thickness.

For the reason of preventing the cured resin layer from cracking, as described above, the ratio ($d_1/d_2$) between the thickness ($d_1$) of the cured resin layer and the thickness ($d_2$) of the polarizer is preferably in the range of 0.3 to 1.2, more preferably in the range of 0.4 to 1.0, and particularly preferably in the range of 0.5 to 0.8.

For the reason of preventing the cured resin layer from cracking, as described above, the difference ($d_1-d_2$) between the thickness ($d_1$) of the cured resin layer and the thickness ($d_2$) of the polarizer is preferably in the range of −20 μm to +5 μm, more preferably in the range of −16 μm to 0 μm, and particularly preferably in the range of −12 μm to −4 μm.

In the polarizing plate of the present invention, the pencil hardness of the cured resin layer surface is preferably at least 6H, more preferably in the range of 7H to 9H, and particularly preferably 9H. The pencil hardness is a pencil scratch value that is measured according to JIS K 5400 (1990 version). There have been no conventional polarizing plates subjected to a hard-coating treatment that have a hardness of at least 6H. The reason is surmised as follows. That is, it is surmised that the reason why the hard-coating layers of conventional polarizing plates cannot have a high hardness of at least 6H is because protective layers such as TAC films are disposed on both sides of a polarizer and hard-coating layers are formed on the surfaces of the protective layers. On the other hand, it is surmised that in the polarizing plate of the present invention, since a cured resin layer is formed directly on the surface of a polarizer using a solventless photocurable composition, a high surface hardness, specifically a pencil hardness of at least 6H, can be obtained. In other words, it is surmised that a high hardness of at least 6H can be obtained because a cured resin layer is formed directly on a polarizer that is harder than the protective layer in the polarizing plate of the present invention, while a hard-coating layer is formed on a soft protective layer in a conventional polarizing plate. As described above, the present inventors are the first to have found that a high hardness of at least 6H can be obtained when a cured resin layer is formed directly on the surface of a polarizer. It can be said that this is an excellent effect that cannot be anticipated by persons skilled in the art. The surmise does not specify or limit the present invention in any way.

The structure of an example of the polarizing plate according to the present invention is shown in a sectional view in FIG. 1(a). In FIG. 1(a), in order to make the structure of the polarizing plate easily understandable, the sizes and ratios of the respective components are different from actual ones. The same applies to another structural diagram (FIG. 1(b)). As shown in FIG. 1(a), in the polarizing plate 10 of this example, a first cured resin layer 2 is formed directly on one surface (the upper surface in FIG. 1(a)) of a polarizer 1, and a second cured resin layer 3 is formed directly on the other surface (the lower surface in FIG. 1(a)) of the polarizer 1. In the polarizing plate 10 of this example, the first cured resin layer 2 and the second cured resin layer 3 each serve as a protective layer and a hard-coating layer. As a result, the polarizing plate 10 has a reduced thickness. In the present invention, the cured resin layer can have a monolayer structure or a layered structure including at least two layers.

Another example of the polarizing plate according to the present invention is shown in a sectional view in FIG. 1(b). In FIG. 1(b), the identical parts to those shown in FIG. 1(a) are indicated with identical numerals. As shown in FIG. 1(b), in a polarizing plate 11 of this example, a cured resin layer 2 is formed directly on one surface (the upper surface in FIG. 1(b)) of a polarizer 1, and a protective layer 5 is formed on the other surface of the polarizer 1, with an adhesive layer 4 being interposed therebetween. In the polarizing plate 11, the cured resin layer 2 serves as a protective layer and a hard-coating layer. As a result, the polarizing plate 11 has a reduced thickness. A hard-coating layer can be formed on the protective layer 5. In the present invention, the adhesive layer and the protective layer can have a monolayer structure or a layered structure including at least two layers.

The polarizing plate of the present invention can have a pressure-sensitive adhesion layer for adhering to another member, on at least one surface thereof. In the polarizing plate of the present invention, the surface structure of the cured resin layer can be an uneven structure. When the surface of the cured resin layer has an uneven structure, it is provided with an antiglare function. In addition, in the polarizing plate of the present invention, an antireflection layer (a low-refractive-index layer) further can be formed on the surface of the cured resin layer.

The thickness of the polarizing plate of the present invention is, for example, in the range of 20 μm to 250 μm, preferably in the range of 40 μm to 200 μm, and more preferably in the range of 60 μm to 180 μm.

In the polarizing plate of the present invention, the transmittance (T) thereof is preferably in the range of 38% to 45%, while the polarization degree (P) thereof is preferably at least 98%. When the transmittance (T) and the polarization degree (P) are in the above-mentioned ranges, display images with higher contrast ratios in the direction perpendicular to the display surface can be obtained in a liquid crystal display including a polarizing plate of the present invention. The transmittance (T) is more preferably in the range of 39% to 44%, while the polarization degree (P) is more preferably at least 99%.

The polarization degree can be determined by measuring a parallel transmittance ($H_0$) and an orthogonal transmittance ($H_{90}$) and using the formula: polarization degree (%)=$\{(H_0-H_{90})/(H_0+H_{90})\}^{1/2} \times 100$. The parallel transmittance ($H_0$) is a transmittance value of a parallel-type laminated polarizing plate produced with two identical polarizing plates stacked together in such a manner that their absorption axes are in parallel with each other. On the other hand, the orthogonal transmittance ($H_{90}$) is a transmittance value of an orthogonal-type laminated polarizing plate produced with two identical polarizing plates stacked together in such a manner that their absorption axes are orthogonal to each other. These transmittances are Y values that have been subjected to visibility correction under a visual field of 2 degrees (an illuminant C) according to JIS Z 8701-1982.

In the polarizing plate of the present invention, the hue value a (the value a of the polarizing plate itself) is preferably at least −2.0, while the hue value b (the value b of the polarizing plate itself) is preferably 4.2 or lower. The most ideal values of the hue values a and h are zero. When the hue values a and b approximately zero, a display image with more vivid colors can be obtained.

[B. Polarizer]

The polarizer to be used in the present invention can be an arbitrary one selected suitably, as long as it allows the object of the present invention to be achieved. Examples of the polarizer include those obtained by allowing hydrophilic polymer films to adsorb iodine and a dichromatic substance such as a dichromatic dye and then uniaxially drawing them, and polyene oriented films, such as a dehydrated polyvinyl alcohol film and a dehydrochlorinated polyvinyl chloride film. Examples of the hydrophilic polymer film include a polyvinyl alcohol film, a partially formalized polyvinyl alcohol film, and a partially saponified ethylene-vinyl acetate copolymer film. In the present invention, a polarizer obtained by allowing a polyvinyl alcohol film to adsorb iodine is preferable.

The thickness of the polarizer is, for example, in the range of 5 μm to 50 μm, preferably in the range of 10 μm to 40 μm, and more preferably in the range of 20 μm to 40 μm.

The composite elastic modulus (Er) of the polarizer is preferably at least 6 GPa. When using a polarizer with a composite elastic modulus of at least 6 GPa, a polarizing plate with a higher hardness can be obtained. The composite elastic modulus is further preferably in the range of 8 GPa to 15 GPa, and particularly preferably in the range of 9 GPa to 14 GPa. The composite elastic modulus (Er) of the polarizer can be adjusted suitably by adjusting, for example, the moisture content and crosslinking density of the polarizer.

In the case of a polarizer obtained by allowing a polyvinyl alcohol film to adsorb iodine, the iodine content is, for example, in the range of 2.0% by weight to 5.0% by weight, and preferably in the range of 2.0% by weight to 4.0% by weight when the optical properties are taken into consideration.

Preferably, the polarizer further contains at least one of potassium and boron. The potassium content in the polarizer is preferably in the range of 0.2% by weight to 1.0% by weight, and more preferably in the range of 0.3% by weight to 0.9% by weight. The boron content in the polarizer is preferably in the range of 0.5% by weight to 3.0% by weight, and more preferably in the range of 1.0% by weight to 2.8% by weight. When the polarizer contains potassium and boron, a polarizer (polarizing plate) can be obtained that has a suitable composite elastic modulus (Er) and a higher polarization degree. A polarizer containing at least one of potassium and boron can be produced by, for example, immersing a film, which is a polarizer-forming material, in a solution of at least one of potassium and boron. The solution also can serve as a solution containing iodine.

The polyvinyl alcohol resin can be obtained by saponifying a vinyl ester polymer that is obtained by polymerizing vinyl ester monomers, for example. The saponification degree of the polyvinyl alcohol resin is preferably in the range of 95 mol % to 99.9 mol % when the durability of the polarizer is taken into consideration. The average polymerization degree of the polyvinyl alcohol resin can be selected suitably according to the intended use, but is preferably in the range of 1200 to 3600. The average polymerization degree can be determined, for example, according to JIS K 6724 (1994 version).

Preferably, the polyvinyl alcohol film contains at least one of a plasticizer and a surfactant. Examples of the plasticizer include polyalcohols such as ethylene glycol and glycerin. On the other hand, examples of the surfactant include a nonionic surfactant. The use of the polyalcohols and surfactant allows the polarizer to have further improved dyeing affinity and drawability.

For a method for obtaining the polyvinyl alcohol film, an arbitrary, suitable forming process can be employed. A conventionally known method can be used for the forming process.

A commercially available film also can be used as the polyvinyl alcohol film without further processing. Examples of the commercially available polyvinyl alcohol film include "Kuraray Vinylon Film" (trade name) manufactured by KURARAY CO., LTD., "TOHCELLO Vinylon Film" (trade name) manufactured by TOHCELLO CO., LTD., and "Nichigo Vinylon Film" (trade name) manufactured by THE NIPPON SYNTHETIC CHEMICAL INDUSTRY CO., LTD.

Figure 2:
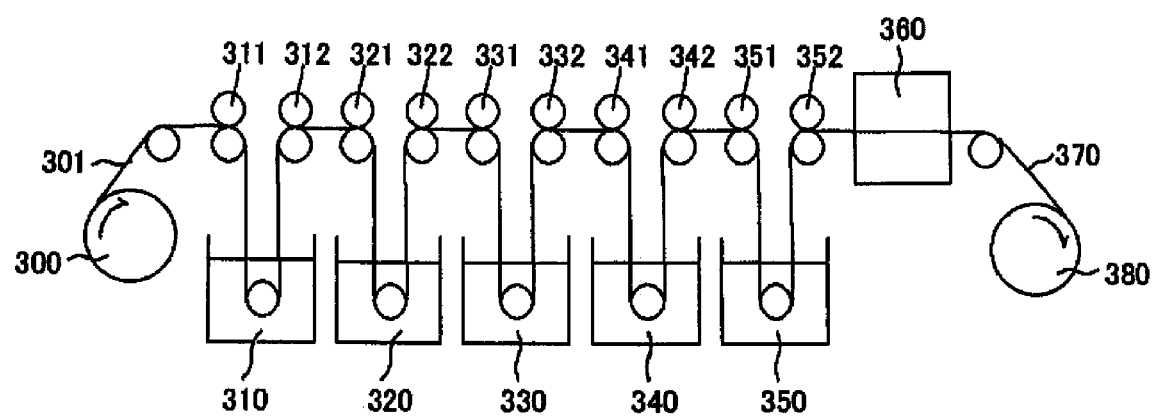
FIG. 2 is a schematic view showing an example of production of a polarizer.

An example of the method of producing a polarizer is described with reference to FIG. 2. As shown in FIG. 2, for instance, a polymer film (a stock film) 301 whose main component is polyvinyl alcohol resin is fed from a delivery part 300 and is immersed in a swelling bath 310 containing pure water and a dye bath 320 containing an iodine aqueous solution, and thereby the polymer film is subjected to a swelling treatment and a dyeing treatment while being tensioned in the longitudinal direction of the film with rolls 311, 312, 321, and 322 whose speed ratios are different from each other. Subsequently, the film that has been subjected to the swelling treatment and the dyeing treatment is immersed in a first crosslinking bath 330 containing potassium iodide and a second crosslinking bath 340, and thereby the film is subjected to a crosslinking treatment and a final drawing treatment while being tensioned in the longitudinal direction of the film with rolls 331, 332, 341, and 342 whose speed ratios are different from each other. The film that has been subjected to the crosslinking treatment is immersed in a washing bath 350 containing pure water with rolls 351 and 352 and thereby the washing treatment is carried out. The film that has been subjected to the washing treatment is dried with a drying means 360 to have a moisture percentage adjusted, for example, to 10% to 30%. Then it is wound up by a winding-up part 380. As described above, the polarizer 370 can be obtained by drawing the stock film so as to have a length that is, for instance, five to seven times the original length, in the series of steps mentioned above.

In order to improve the adhesiveness to, for example, the cured resin layer, the polarizer can be subjected to an arbitrary surface modification treatment. Examples of the surface modification treatment include a corona treatment, a plasma treatment, a glow discharge treatment, a flame treatment, an ozone treatment, a UV-ozone treatment, and an ultraviolet treatment. These treatments can be used individually or two or more of them can be used in combination.

[C. Cured Resin Layer]

The cured resin layer of the present invention is formed of a photocurable composition containing the aforementioned components (A), (B), and (C). In the present invention, the polyfunctional acrylic monomer or the polyfunctional methacrylic monomer, component (A) described above, is an acrylic monomer or a methacrylic monomer that has at least two acryloyl groups or methacryloyl groups in its molecular structure. In the present invention, the photocurable prepolymer, component (B) described above, is a polymer that has a photoreactive functional group in its molecular structure and at least two repeating structural units. The number of the repeating structural units is, for example, in the range of 2 to 20.

The cured resin layer can contain unreacted components, which are components (A), (B), and (C) that have remained without reacting, or can contain no unreacted components. However, in order to obtain a higher surface hardness, preferably, less unreacted components are contained in the cured resin layer, and ideally, no unreacted components are contained therein.

In terms of the hardness, the thicker the cured resin layer, the higher the hardness. However, when being excessively thick, the cured resin layer may crack. From the viewpoints of high hardness and crack prevention, it is preferable that the thickness of the cured resin layer be set suitably. The thickness of the cured resin layer is, for example, in the range of 5 µm to 30 µm, preferably in the range of 7 µm to 23 µm, and more preferably in the range of 10 µm to 23 µm.

The composite elastic modulus (Er) of the cured resin layer is preferably at least 4 GPa, more preferably in the range of 4 GPa to 8 GPa, and further preferably in the range of 5 GPa to 7 GPa. The hardness (H) of the cured resin layer is preferably at least 400 MPa, more preferably in the range of 400 MPa to 800 MPa, and further preferably in the range of 500 MPa to 700 MPa. When using a curable composition having Er and H in the aforementioned ranges, a cured resin layer with a higher value of scratch hardness such as pencil hardness can be formed.

The photocurable composition to be used in the present invention is of a solventless type that contains no solvent. In the case of using a solventless photocurable composition, since no solvent is contained, the polarizer to which it is applied is not deteriorated and a material with a lower solvent resistance also can be used as a material for the polarizer. Furthermore, when the cured resin layer is to be formed, a step of drying a solvent is not required, and various problems (for instance, whitening, cracks, and insufficient curing) that are caused by the solvent do not occur. Furthermore, since no solvent volatilizes in the atmosphere in forming the cured resin layer, no environmental pollution or health problem of operators caused by a solvent occurs.

The polyfunctional acrylic monomer or methacrylic monomer, component (A), is used in the present invention to improve the crosslinking density of the cured resin layer. The polyfunctional acrylic monomer or methacrylic monomer is preferably one having 4 to 6 acryloyl groups or methacryloyl groups in its molecular structure and more preferably an acrylic monomer or methacrylic monomer represented by general formula (I) described above. A preferred example of general formula (I) is one represented by general formula (II) below.

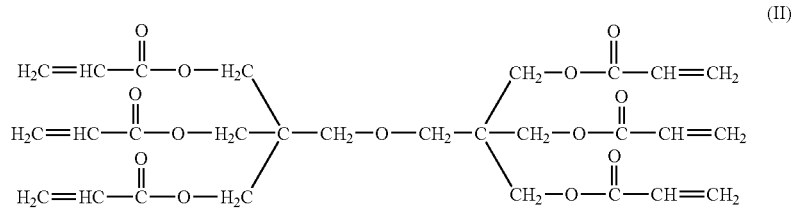

The weight average molecular weight (Mw) of the polyfunctional acrylic monomer or methacrylic monomer is preferably in the range of 250 to 800. When the weight average molecular weight (Mw) is in the aforementioned range, a cured resin layer that has a high surface hardness and that undergoes less contraction due to curing can be obtained. The weight average molecular weight (Mw) is preferably in the range of 320 to 700 and more preferably in the range of 400 to 650.

With respect to the aforementioned component (A), examples of the polyfunctional acrylic monomer other than those described above include dipentaerythritol pentaacrylate, pentaerythritol tetraacrylate, trimethylolpropane triacrylate, ditrimethylolpropane tetraacrylate, and tris(acryloxyethyl)isocyanurate. Furthermore, with respect to component (A), examples of the polyfunctional methacrylic monomer other than those described above include dipentaerythritol pentamethacrylate, pentaerythritol tetramethacrylate, trimethylolpropane trimethacrylate, ditrimethylolpropane tetramethacrylate, and tris(methacryloxyethyl)isocyanurate. With respect to these polyfunctional acrylic monomers or methacrylic monomers, one of them can be used individually, or two or more of them can be used in combination.

The polyfunctional acrylic monomer or methacrylic monomer to be used can be a commercialized product. One of the commercialized products can be used individually, or two or more of them can be used in combination. Examples of the polyfunctional acrylic monomer or methacrylic monomer that is a commercialized product include "ARONIX" (trade name) series and "ARONOXETANE" (trade name) series manufactured by TOAGOSEI CO., LTD., and "KAYARAD" (trade name) series manufactured by NIPPON KAYAKU CO., LTD.

In the present invention, the photocurable prepolymer (also referred to as a "photocurable oligomer"), component (B) described above, is used mainly for improving the physical property of the cured resin layer. The use of components (A) and (B) in combination allows the cured resin layer to be provided with suitable flexibility and thereby a cured resin layer that has a higher surface hardness and is excellent in adhesiveness to, for example, a polarizer, can be obtained.

The photocurable prepolymer is not particularly limited. Examples thereof include polyester acrylate, polyester methacrylate, epoxy acrylate, epoxy methacrylate, polyurethane acrylate, and polyurethane methacrylate. One of these prepolymers can be used individually, or two or more of them can be used in combination. Among these prepolymers, polyurethane acrylate and polyurethane methacrylate are preferable. Since polyurethane acrylate and polyurethane methacrylate have large molecular weights, the use thereof makes it possible to reduce the crosslinking density per unit area of the cured resin layer and to further prevent the cured resin layer from contracting due to curing. As a result, cracks or warping of the polarizing plate that are caused by the contraction due to curing can be further reduced.

In view of improving the surface hardness of the cured resin layer and preventing it from contracting due to curing, the weight average molecular weight (Mw) of the photocurable prepolymer is preferably in the range of 250 to 5000, more preferably in the range of 300 to 4000, and further preferably in the range of 400 to 3000.

The polyurethane acrylate or polyurethane methacrylate has a urethane bond (—NHCO—) and at least one of an acryloyl group and a methacryloyl group in its molecular structure. The polyurethane acrylate and polyurethane methacrylate can be synthesized, for example, by the following method (a) or (b):

(a) allowing the following to react together: polyisocyanate having at least two isocyanate groups, polyol having at least two hydroxyl groups, and at least one of hydroxy acrylate having at least one hydroxyl group and hydroxy methacrylate having at least one hydroxyl group; or (b) allowing the following to react with each other: polyisocyanate having at least two isocyanate groups, and at least one of hydroxy acrylate having at least two hydroxyl groups and hydroxy methacrylate having at least two hydroxyl groups.

Examples of polyisocyanate include tetramethylene diisocyanate, hexamethylene diisocyanate, isophorone diisocyanate, 2,4-tolylene diisocyanate, 4,4'-diphenyl diisocyanate, 1,5-naphthalene diisocyanate, and xylene diisocyanate. Examples of polyol include 1,3-butanediol, 1,4-butanediol, trimethylol ethane, trimethylol propane, ditrimethylol ethane, dipentaerythritol, and diglycerol. Examples of hydroxy acrylate include 2-hydroxyethyl acrylate, 4-hydroxycyclohexyl acrylate, 5-hydroxycyclooctyl acrylate, and pentaerythritol triacrylate. Examples of hydroxy methacrylate include 2-hydroxyethyl methacrylate, 4-hydroxycyclohexyl methacrylate, 5-hydroxycyclooctyl methacrylate, and pentaerythritol trimethacrylate.

The polyurethane acrylate and polyurethane methacrylate to be used herein can be commercialized products. One of the commercialized products can be used individually, or two or more of them can be used in combination. Examples of commercially available polyurethane acrylate or polyurethane methacrylate include "SHIKOH" (trade name) series manufactured by THE NIPPON SYNTHETIC CHEMICAL INDUSTRY CO., LTD., and aliphatic urethane acrylate manufactured by DAICEL-CYTEC COMPANY LTD.

From the viewpoints of, for example, the surface hardness and adhesiveness of the cured resin layer, the mass ratio (A:B) of component (A) and component (B) is, for instance, in the range of 98:2 to 50:50, and preferably in the range of 98:2 to 60:40 (where A+B=100).

Preferably, the photocurable composition further contains a reactive diluent, component (D) mentioned above. The use of the reactive diluent allows the viscosity of the photocurable composition to be adjusted in the range that is suitable for application thereof and thereby the cured resin layer with excellent surface uniformity can be obtained.

Monomers with a small number of functional groups, specifically 1 to 3 functional groups, are used for the reactive diluent. Examples of the monomers with a small number of functional groups include trimethylolpropane triacrylate, trimethylolpropane trimethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, neopentyl glycol diacrylate, neopentyl glycol dimethacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, tetrahydrofurfuryl acrylate, tetrahydrofurfuryl methacrylate, acryloyl morpholine, and methacryloyl morpholine. One of these reactive diluents can be used individually, or two or more of them can be used in combination.

From the viewpoints of the viscosity of the photocurable composition and the surface hardness of the cured resin layer, the mass ratio (A+B:D) between the sum (A+B) of components (A) and (B) and component (D) is, for example, in the range of 95:5 to 50:50 and preferably in the range of 85:15 to 65:35 (where A+B+D=100).

The photopolymerization initiator, component (C), is not particularly limited. Examples thereof include an acetophenone initiator, a benzoin ether initiator, a benzophenone initiator, and a thioxanthone initiator. From the viewpoints of, for example, color protection and curing rate at the time of curing, the photopolymerization initiator, component (C), is preferably an acetophenone initiator. Examples of the acetophenone initiator include diethoxyacetophenone, benzil dimethyl ketal, 1-hydroxy cyclohexyl phenyl ketone, 2-hydroxy-2-methyl-1-phenyl propane-1-one, 2-methyl-2-morpholino(4-thiomethylphenyl)propane-1-one, 4-(2-hydroxyethoxy)phenyl-(2-hydroxy-2-propyl)ketone, and 1-phenyl-1, 2-propanedione-2-(o-ethoxycarbonyl)oxime. One of these photopolymerization initiators can be used individually, or two or more of them can be used in combination.

For the photopolymerization initiator, a commercialized product can be used without further processing, or two or more of commercialized products can be used in combination. Examples of commercially available photopolymerization initiators include "IRGACURE" (trade name) series manufacture by CIBA SPECIALTY CHEMICALS. Furthermore, commercialized various products manufactured by TOKYO CHEMICAL INDUSTRY CO., LTD. also can be used for the photopolymerization initiator.

When component (D) is not used for the photocurable composition, the amount of the photopolymerization initiator, component (C), is preferably 1 to 10 parts by weight and more preferably 2 to 8 parts by weight, with respect to 100 parts by weight of the sum (A+B) of components (A) and (B). On the other hand, when component (D) is used, the amount of the photopolymerization initiator is preferably 1 to 10 parts by weight and more preferably 2 to 8 parts by weight, with respect to 100 parts by weight of the sum (A+B+D) of components (A), (B), and (D).

The photocurable composition can contain suitable arbitrary additives. Examples of the additives include a leveling agent, a delusterant, a sensitizer, an antistatic agent, an antioxidant, a thermal polymerization inhibitor, a tackifier, a plasticizer, and a nonreactive polymer. The amount of the additives to be used is preferably in the range of larger than zero but not larger than 5 parts by weight with respect to 100 parts by weight of the sum (A+B) of components (A) and (B).

A suitable arbitrary method can be employed as the method of photocuring the solventless photocurable composition. For example, the solventless photocurable composition is applied directly onto the surface of a polarizer to form a coating film and then the coating film is irradiated with at least one of ultraviolet rays and electron rays. With respect to the irradiation, the coating film can be irradiated directly or can be irradiated from the polarizer side.

Figure 3:
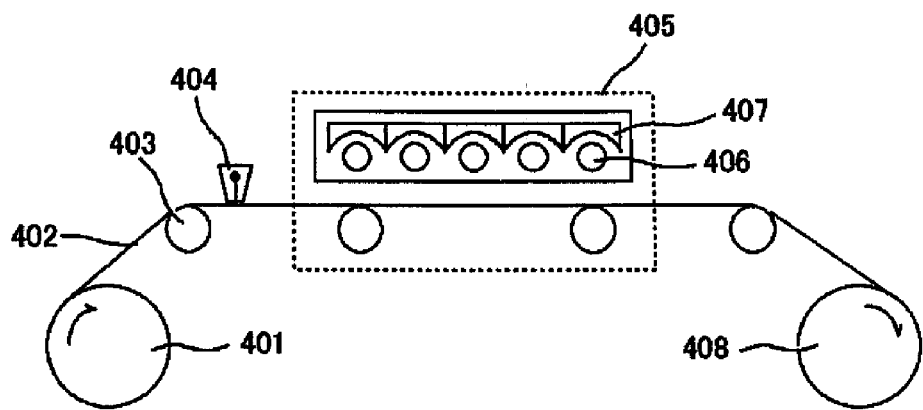
FIG. 3 is a schematic view showing an example of production of a polarizing plate according to the present invention.

An example of the method of producing a cured resin layer is described with reference to FIG. 3. As shown in FIG. 3, a polarizer 402 is fed from a delivery part 401 and is carried by a guide roll 403 to a coater section 404. In the coater section 404, the solventless photocurable composition is applied thereonto to form a coating film. Next, the polarizer with the coating film formed thereon is sent to an ultraviolet irradiation means 405 provided with light sources 406 and irradiators 407. In the ultraviolet irradiation means 405, the coating film is irradiated with light and thereby a cured resin layer is formed on the surface of the polarizer. A resultant laminate of the polarizer and cured resin layer is wound up by a winding-up part 408.

The method of applying the photocurable composition is a coating method using a coater, for example. Examples of the coater include a reverse roll coater, a positive rotation roll coater, a gravure coater, a knife coater, a rod coater, a slot die coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Preferred coaters are a reverse roll coater, a positive rotation roll coater, a gravure coater, a rod coater, a slot die coater, a slot orifice coater, a curtain coater, and a fountain coater. Preferably, the coater employs a coater head with a closed applicator to prevent the concentration of the coating solution from changing. Application methods using the aforementioned coaters are preferable because they make it possible to obtain cured resin layers with less variation in thickness, i.e. with uniform thickness.

The ultraviolet irradiation means includes, for example, a light source, an irradiator, a cooling apparatus, and a power supply unit. Examples of the light source include a high-pressure mercury lamp, an ozoneless mercury lamp, a xenon lamp, a fusion lamp, and a metal halide lamp. With considerations given to, for example, the curing time and the ultraviolet penetration depth, the wavelength of the light source can be selected suitably. The wavelength of the light source is, for example, in the range of 100 nm to 400 nm and preferably in the range of 210 nm to 380 nm. The cumulative quantity of irradiation light is preferably in the range of 50 mJ/cm$^2$ to 1000 mJ/cm$^2$.

Preferably, the irradiators each are provided with a filter (for instance, a heat ray cut filter) for cutting wavelengths of infrared rays and visible rays to reduce the thermal damage to the polarizer. The cooling apparatus and the power supply unit are used to keep the temperature of the whole light sources and irradiators constant and to allow the light sources to be lighted stably. Examples of the cooling apparatus include those of an air cooling (exhaust air or blow/exhaust air) type or a water cooling type.

The cured resin layer can contain fine particles to allow the surface to have an uneven structure. When the surface of the cured resin layer has an uneven structure, antiglare properties can be provided. Examples of the fine particles include inorganic fine particles and organic fine particles. The inorganic particles are not particularly limited. Examples thereof include silicon oxide fine particles, titanium oxide fine particles, aluminum oxide fine particles, zinc oxide fine particles, tin oxide fine particles, calcium carbonate fine particles, barium sulfate fine particles, talc fine particles, kaolin fine particles, and calcium sulfate fine particles. Furthermore, the organic fine particles also are not particularly limited. Examples thereof include polymethyl methacrylate acrylate resin powder (PMMA fine particles), silicone resin powder, polystyrene resin powder, polycarbonate resin powder, acrylic styrene resin powder, benzoguanamine resin powder, melamine resin powder, polyolefin resin powder, polyester resin powder, polyamide resin powder, polyimide resin powder, and polyethylene fluoride resin powder. One of these inorganic fine particles and organic fine particles can be used individually, or two or more of them can be used in combination.

The shape of the fine particles is not particularly limited. For instance, they can have a bead-like, substantially spherical shape or can have an indeterminate shape like powder. The weight average particle size of the fine particles is, for example, in the range of 1 to 30 μm and preferably in the range of 2 to 20 μm. The fine particles have preferably a substantially spherical shape and more preferably a substantially spherical shape with an aspect ratio of 1.5 or lower.

The ratio of the fine particles to be added is not particularly limited and can be set suitably. The ratio of the fine particles to be added is, for example, in the range of 2 to 60 parts by weight and preferably in the range of 1 to 50 parts by weight, with respect to 100 parts by weight of the solventless photocurable composition.

From the viewpoints of, for example, preventing interference fringes and light scattering from occurring at the interface between the fine particles and the cured resin layer, it is preferable that the difference in refractive index between the fine particles and the cured resin layer be small. Specifically, it is preferable that the difference in refractive index between the fine particles and the cured resin layer be smaller than 0.05.

In the polarizing plate of the present invention, an antireflection layer (low-refractive-index layer) can be disposed on the cured resin layer. For instance, when the polarizing plate is attached to an image display, light reflection that is caused at the interface between air and the cured resin layer is one of the factors that reduce visibility of images. The antireflection layer reduces the surface reflection. The antireflection layer can be formed by a conventional method. Furthermore, an anti-stain layer can be formed on the antireflection layer. The anti-stain layer can be formed by a conventional method.

[D. Protective Layer]

In the present invention, the "protective layer" is formed separately from the cured resin layer is formed on the opposite side to the side of the polarizer on which the cured resin layer has been formed as shown in FIG. 1(b), and is an arbitrary component. The material to be used for forming the protective layer is preferably a cellulose resin such as TAC or norbornene resins from the viewpoints of, for example, polarization properties and durability. Examples of commercially available films formed of these resins include "FUJITAC" (trade name) manufactured by FUJI PHOTO FILM CO., LTD., "ZEONOR" (trade name) manufactured by NIPPON ZEON CO. LTD., and "ARTON" (trade name) manufactured by JSR CORPORATION.

The thickness of the protective film can be determined suitably. From the viewpoints of, for instance, strength, workability such as handling properties, and reduction in thickness, the thickness is, for example, in the range of 1 µm to 500 µm, preferably in the range of 5 g/m to 200 µm, and more preferably in the range of 10 µm to 150 µm. With respect to the phase difference value of the protective layer, the phase difference value (Re) in the film plane is preferably in the range of 0 nm to 5 nm, more preferably in the range of 0 nm to 3 nm, and further preferably in the range of 0 nm to 1 nm, while the phase difference value (Rth) in the thickness direction is preferably in the range of 0 nm to 15 nm, more preferably in the range of 0 nm to 12 nm, further preferably in the range of 0 nm to 5 nm, and most preferably in the range of 0 nm to 3 nm.

The adhesive to be used for stacking the polarizer and the protective layer together can be, for example, an adhesive made of an acrylic polymer or a vinyl alcohol polymer. From the viewpoint of adhesion to the polarizer, the adhesive is preferably one made of a vinyl alcohol polymer. The adhesive can contain a water-soluble crosslinking agent of a vinyl alcohol polymer such as boric acid, borax, glutaraldehyde, melamine, or oxalic acid.

When a polymer film containing a norbornene resin is used as the protective film, the adhesive to be used herein is preferably one that is excellent in transparency, has a low refractive index, and can exhibit sufficiently high adhesive strength even when it is formed as a thin layer. Examples of such an adhesive include a dry lamination adhesive in which a polyurethane resin solution and a polyisocyanate resin solution are mixed together, a styrene-butadiene rubber adhesive, and a two-part epoxy curable adhesive (for instance, one made of two parts of epoxy resin and polythiol, one made of two parts of epoxy resin and polyamide). A solvent adhesive, such as a two-part epoxy curable adhesive, is particularly preferable. In some of the adhesives, adhesive strength can be improved by using a suitable primer for adhesion. In the case of using such adhesives, it is preferable that the primer for adhesion be used.

[E. Stacking Polarizing Plate on Liquid Crystal Cell]

As described above, when the polarizing plate of the present invention is stacked on a liquid crystal cell, it is preferable that a pressure-sensitive adhesive layer be provided on the surface of the polarizing plate, for example. This makes it easy to stack the polarizing plate of the present invention on the liquid crystal cell.

The pressure-sensitive adhesive is not particularly limited, but can be selected suitably from those containing, as a base polymer, acrylic polymer, silicone polymer, polyester, polyurethane, polyamide, polyvinyl ether, vinyl acetate/vinyl chloride copolymer, modified polyolefin, epoxy polymer, fluorinated polymer, or rubber polymer, such as natural rubber and synthetic rubber. Particularly, an acrylic pressure-sensitive adhesive is preferable because it has excellent optical transparency, exhibits an appropriate wettability, cohesiveness, and adhesiveness, and is excellent in weather resistance and heat resistance.

[F. Applications]

The polarizing plate of the present invention can be used suitably for various image displays such as liquid crystal displays (LCDs) and EL displays (ELDs). A liquid crystal display of the present invention has the same configuration as that of conventional liquid crystal displays except that a polarizing plate of the present invention is used. The liquid crystal display of the present invention can be produced, for example, by assembling respective components such as a liquid crystal cell, optical members such as a polarizing plate of the present invention, and a lighting system (for instance, a backlight) according to need, and incorporating a drive circuit.

In the present invention, the configuration of the liquid crystal display is not particularly limited. Examples of the liquid crystal display include one in which an optical member such as a polarizing plate of the present invention is disposed on one or both sides of a liquid crystal cell and one in which a backlight or a reflector is used in a lighting system. When optical members such as polarizing plates of the present invention are placed on both sides of a liquid crystal cell, they can be identical to each other or can be different from each other. Furthermore, optical components and optical members such as a diffusion plate, an antiglare layer, an antireflection layer, a protective plate, a prism array, and a lens array sheet can be disposed in the liquid crystal display of the present invention.

The image display of the present invention is used for suitable arbitrary applications. Examples of the applications include: business machines such as desktop personal computers, notebook personal computers, and copying machines; portable devices such as mobile phones, watches, digital cameras, personal digital assistants (PDAs), and portable game devices; home electrical equipment such as video cameras, television sets, and microwave ovens; vehicle equipment such as back monitors, monitors for car navigation systems, and car audio systems; display equipment such as monitors for commercial store information; security equipment such as surveillance monitors; and nursing care and medical equipment such as monitors for nursing care and monitors for medical treatments.

EXAMPLES

Next, examples of the present invention are described together with a comparative example. The present invention is not specified or limited by the examples and the comparative example. The respective analytical methods employed in the examples and the comparative example are as follows.

(1) Method of Measuring Thickness

When the thickness was less than 10 µm, measurement was carried out using a spectrophotometer for a thin film ["Multi Channel Photo Detector MCPD-2000" (product name) manufactured by OTSUKA ELECTRONICS CO., LTD.]. When the thickness was at least 10 µm, measurement was carried out using a digital micrometer "KC-351C" manufactured by ANRITSU CORPORATION.

(2) Method of Measuring Contents of Respective Elements (I, K and B) of Polarizer Contents of the respective elements were determined from X-ray intensities of circular samples with a diameter of 10 mm measured under the following conditions in X-ray fluorescence analysis, using an analytical curve prepared with standard samples beforehand.

Analyzer: an X-ray fluorescence analyzer (XRF) "ZSX100e" manufactured by RIGAKU INDUSTRIAL CORP.

Anticathode: rhodium

Analyzing crystal: lithium fluoride

Excitation light energy: 40 kV-90 mA

Quantification method: FP method (3) Method of Measuring Transmittance and Polarization Degree of Polarizing Plate The transmittance and polarization degree of a polarizing plate were measured by the aforementioned method using a spectrophotometer ["DOT-3" (product name) manufactured by MURAKAMI COLOR RESEARCH LABORATORY]

(4) Method of Measuring Hardness (H) and Composite Elastic Modulus (Er)

A small cut piece of a polarizing plate was buried in resin. Using a Cryo Ultramicrotome, this was frozen, and it was then subjected to ultraprecision cutting. Thus a sample was prepared. Using "TriboIndenter" (product name) manufactured by HYSITRON INCORPORATED, the section of the sample was subjected to single indentation measurement (indenter: Berkovich (with a triangular pyramid shape), indentation depth: 230 nm to 280 nm). The measurement was carried out three times per sample and then the average value was determined.

(5) Method of Measuring Pencil Hardness

Using pencils with a different hardness from each other, the pencil scratch value was determined by a test method according to JIS K 5400 (1990 version).

Example 1

A polymer film (with a thickness of 75 µm, "VF-PS#7500" (trade name) manufactured by KURARAY CO., LTD.) whose main component was polyvinyl alcohol resin was immersed in five baths under the following conditions (1) to (5), while being tensioned in the longitudinal direction thereof. The film was drawn so that the final draw magnification was 6.2 times the original film length. This drawn film was dried for one minute in an air circulation drying oven with a temperature of 40° C. Thus a polarizer A with a thickness of 30 µm (with a composite elastic modulus of 10.9 GPa) was prepared. In this polarizer A, the contents of the respective elements were as follows: iodine content=3.0% by weight, potassium content=0.6% by weight, and boron content=2.0% by weight.

<Conditions>

(1) Swelling bath: 30° C. pure water (2) Dye bath: 30° C. aqueous solution containing 0.03 part by weight of iodine and 0.2 part by weight of potassium iodide, with respect to 100 parts by weight of water (3) First crosslinking bath: 40° C. aqueous solution containing 3% by weight of potassium iodide and 3% by weight of boric acid (4) Second crosslinking bath: 60° C. aqueous solution containing 5% by weight of potassium iodide and 4% by weight of boric acid (5) Washing bath: 25° C. aqueous solution containing 3% by weight of potassium iodide Next, a 0.1-µm thick adhesive layer was formed on one surface of the polarizer A using a water-soluble adhesive ("GOHSEFIMER Z200" (trade name) manufactured by THE NIPPON SYNTHETIC CHEMICAL INDUSTRY CO., LTD.) whose main component was polyvinyl alcohol resin. A TAC film (with a thickness of 80 µm, "ZRF80S" (trade name) manufactured by FUJI PHOTO FILM CO., LTD.) was attached to one surface of the polarizer A, with the adhesive layer being interposed therebetween. Thus a protective layer was formed.

Next, a solventless photocurable composition with the following composition was applied to the other surface of the polarizer A to form a coating film. The coating film was irradiated with ultraviolet rays using a high-pressure mercury lamp so that the cumulative light quantity was 300 mJ/cm$^2$ at a wavelength of 365 nm. Thus a 22-µm thick cured resin layer was formed.

<Solventless Photocurable Composition>

Component (A): 74 parts by weight of acrylic monomer ("KAYARAD DPHA" (trade name) manufactured by NIPON KAYAKU CO., LTD., Mw=578) represented by general formula (II) mentioned above Component (B): 5 parts by weight of polyurethane acrylate ("SHIKOH UV-7600B" (trade name) manufactured by THE NIPPON SYNTHETIC CHEMICAL INDUSTRY CO., LTD.)

Component (C): 5 parts by weight of 1-hydroxy cyclohexyl phenyl ketone ("IRGACURE 184" (trade name) manufactured by CIBA SPECIALTY CHEMICALS)

Component (D): 21 parts by weight of tetrahydrofurfuryl acrylate (manufactured by WAKO PURE CHEMICAL INDUSTRIES, LTD.)

The polarizing plate A-1 thus produced is provided with the polarizer A (with a thickness of 30 µm), the cured resin layer (with a thickness of 22 µm) formed directly on one surface of the polarizer, and the TAC film (protective layer) that was attached to the other surface of the polarizer, with the adhesive layer being interposed therebetween. The polarizing plate A-1 had a transmittance of 41.1% and a polarization degree of 99.9%. The pencil hardness of the cured resin layer surface of the polarizing plate A-1 was 9H. The cured resin layer of the polarizing plate A-1 had a composite elastic modulus (Er) of 5.5 GPa and a hardness (H) of 541 MPa. After the polarizing plate A-1 was stored in a room at 23° C. for 24 hours, the state of the cured resin layer surface was observed visually. As a result, no cracks were observed at the cured resin layer surface.

Example 2

A polarizing plate A-2 was produced in the same manner as in Example 1 except that the cured resin layer had a thickness of 10 μm. In the polarizing plate A-2, the transmittance, the polarization degree, and the composite elastic modulus of the cured resin layer were the same as those of Example 1. The pencil hardness of the cured resin layer surface of the polarizing plate A-2 was 7 H. After the polarizing plate A-2 was stored in a room at 23° C. for 24 hours, the state of the cured resin layer surface was observed visually. As a result, no cracks were observed at the cured resin layer surface.

Example 3

A polarizing plate A-3 was produced in the same manner as in Example 1 except that the cured resin layer had a thickness of 15 μm. In the polarizing plate A-3, the transmittance, the polarization degree, and the composite elastic modulus of the cured resin layer were the same as those of Example 1. The pencil hardness of the cured resin layer surface of the polarizing plate A-3 was 9 H. After the polarizing plate A-3 was stored in a room at 23° C. for 24 hours, the state of the cured resin layer surface was observed visually. As a result, no cracks were observed at the cured resin layer surface.

Example 4

A polarizing plate A-4 was produced in the same manner as in Example 1 except that the cured resin layer had a thickness of 25 μm. In the polarizing plate A-4, the transmittance, the polarization degree, and the composite elastic modulus of the cured resin layer were the same as those of Example 1. The pencil hardness of the cured resin layer surface of the polarizing plate A-4 was 9H. After the polarizing plate A-4 was stored in a room at 23° C. for 24 hours, the state of the cured resin layer surface was observed visually. As a result, cracks were observed at the cured resin layer surface.

Comparative Example

A polarizing plate ("NPF SIG1224DU" (trade name) manufactured by NITTO DENKO CORPORATION; the composite elastic modulus of a TAC film=5.8 GPa) was prepared that included a TAC film as a protective layer on each side of a polarizer. A cured resin layer was formed on the surface of one TAC film of the polarizing plate in the same manner as in Example 1. The polarizing plate B thus produced had a transmittance of 41.1% and a polarization degree of 99.9%. The pencil hardness of the cured resin layer surface of the polarizing plate B was 5H.

Reference Example

A cured resin layer was formed on a surface of a PET film ("Lumirror S27E" (trade name) manufactured by TORAY INDUSTRIES, INC., with a thickness of 75 μm and a composite elastic modulus of 5.8 GPa) in the same manner as in Example 1. The pencil hardness of the cured resin layer surface of the laminate thus produced was 4H.

<Evaluation>

The cured resin layers of the polarizing plates described in Examples 1 to 4 each were formed by applying a solventless photocurable composition directly to the surface of a polarizer and then photocuring it. These polarizing plates had remarkably high hardness (pencil hardness: 7 H to 9 H) as compared to conventional polarizing plates. On the other hand, the cured resin layer of the polarizing plate of the comparative example was formed on the surface of the TAC film that was used as a protective layer for the polarizer. The surface hardness of the polarizing plate of the comparative example was considerably lower (pencil hardness: 5 H) than those of the examples. The cured resin layer of the laminate of the reference example was formed on the surface of a PET film that was used, for example, for a touch panel. The surface hardness of the laminate of the reference example also was considerably lower (pencil hardness: 4 H) than those of the examples as in the case of the comparative example.

Furthermore, in Examples 1 to 3 in which the thickness of the cured resin layer was less than 23 μm, no cracks occurred at the cured resin layer surface. On the other hand, in Example 4 in which the thickness of the cured resin layer was 25 μm, cracks that occurred at the cured resin layer surface were observed.

As described above, the polarizing plate of the present invention has excellent polarization properties, has remarkably higher surface hardness than those of conventional polarizing plates, and can have reduced thickness. Accordingly, the use of the polarizing plate of the present invention is highly effective in preventing scratches during the assembling process or the use of the liquid crystal display while allowing an image display such as a liquid crystal display to have reduced thickness.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polarizing plate comprising a polarizer and a cured resin layer,
wherein the cured resin layer is formed directly on at least one surface of the polarizer, and the cured resin layer is formed of a solventless photocurable composition containing the following components (A), (B), and (C):
(A) at least one of a polyfunctional acrylic monomer and a polyfunctional methacrylic monomer;
(B) a photocurable prepolymer; and
(C) a photopolymerization initiator.

2. The polarizing plate according to claim 1, wherein a ratio ($d_1/d_2$) between thickness ($d_1$) of the cured resin layer and thickness ($d_2$) of the polarizer is in a range of 0.3 to 1.2.

3. The polarizing plate according to claim 1, wherein a difference ($d_1-d_2$) between thickness ($d_1$) of the cured resin layer and thickness ($d_2$) of the polarizer is in the range of −20 μm to 5 μm.

4. The polarizing plate according to claim 1, wherein the polarizer has a composite elastic modulus of at least 6 GPa.

5. The polarizing plate according to claim 1, wherein the cured resin layer has a thickness in a range of 10 μm to 30 μm.

6. The polarizing plate according to claim 1, wherein the polyfunctional acrylic monomer or the polyfunctional methacrylic monomer, component (A), includes in its molecular structure at least four groups selected from an acryloyl group and a methacryloyl group.

7. The polarizing plate according to claim 6, wherein the polyfunctional acrylic monomer and the polyfunctional methacrylic monomer, component (A), are monomers represented by the following general formula (I):

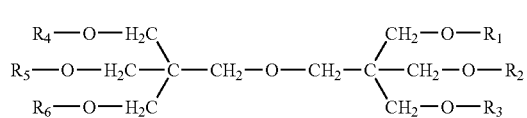

where $R_1$, $R_2$, $R_3$, $R_4$, $R_5$, and $R_6$ each are selected from a hydrogen atom, an acryloyl group, and a methacryloyl group, and at least four of $R_1$, $R_2$, $R_3$, $R_4$, $R_5$, and $R_6$ are selected from an acryloyl group and a methacryloyl group.

8. The polarizing plate according to claim 1, wherein the photocurable prepolymer, component (B), is at least one of polyurethane acrylate and polyurethane methacrylate.

9. The polarizing plate according to claim 1, wherein the solventless photocurable composition comprises the following component (D): (D) a reactive diluent.

10. The polarizing plate according to claim 1, wherein the photopolymerization initiator, component (C), is an acetophenone initiator.

11. The polarizing plate according to claim 1, wherein the polarizer contains iodine and polyvinyl alcohol resin.

12. The polarizing plate according to claim 1, wherein the cured resin layer serves as both a hard-coating layer and a protective layer.

13. An image display comprising a polarizing plate mounted thereon, the polarizing plate is a polarizing plate according to claim 1.

* * * * *

UNITED STATES PATENT AND TRADEMARK OFFICE
CERTIFICATE OF CORRECTION

PATENT NO. : 7,622,055 B2  Page 1 of 1
APPLICATION NO. : 11/748212
DATED : November 24, 2009
INVENTOR(S) : Shinya Nakano et al.

It is certified that error appears in the above-identified patent and that said Letters Patent is hereby corrected as shown below:

On the Title Page;
Insert
Item -- (30) Foreign Application Priority Data
May 16, 2006 JAPAN ........................... 2006-136943
April 9, 2007 JAPAN ............................ 2007-102200 --

Signed and Sealed this

Fourth Day of May, 2010

David J. Kappos
*Director of the United States Patent and Trademark Office*